United States Patent
Kulkarni et al.

(10) Patent No.: US 9,441,114 B2
(45) Date of Patent: Sep. 13, 2016

(54) HIGH TEMPERATURE BOND COATING WITH INCREASED OXIDATION RESISTANCE

(75) Inventors: Anand A. Kulkarni, Oviedo, FL (US); Jonathan E. Shipper, Orlando, FL (US); Werner Stamm, Mülheim an der Ruhr (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 249 days.

(21) Appl. No.: 13/228,543

(22) Filed: Sep. 9, 2011

(65) Prior Publication Data
US 2013/0061775 A1   Mar. 14, 2013

(51) Int. Cl.
  C09D 1/00   (2006.01)
  C23C 28/00  (2006.01)
  F01D 5/28   (2006.01)
  C23C 30/00  (2006.01)

(52) U.S. Cl.
  CPC ............. *C09D 1/00* (2013.01); *C23C 28/3215* (2013.01); *C23C 28/3455* (2013.01); *C23C 30/00* (2013.01); *F01D 5/288* (2013.01)

(58) Field of Classification Search
  None
  See application file for complete search history.

(56) References Cited

U.S. PATENT DOCUMENTS

| | | | |
|---|---|---|---|
| 4,743,514 A * | 5/1988 | Strangman et al. | 428/678 |
| 6,610,419 B1 | 8/2003 | Stamm | |
| 6,924,046 B2 | 8/2005 | Stamm | |
| 6,974,638 B2 | 12/2005 | Stamm et al. | |
| 7,250,222 B2 | 7/2007 | Halberstadt et al. | |
| 7,261,955 B2 | 8/2007 | Schutze et al. | |
| 7,338,719 B2 | 3/2008 | Quadakkers et al. | |
| 7,364,801 B1 * | 4/2008 | Hazel et al. | 428/632 |
| 7,368,177 B2 | 5/2008 | Quadakkers et al. | |
| 7,584,669 B2 | 9/2009 | Dankert et al. | |
| 7,695,827 B2 | 4/2010 | Quadakkers et al. | |
| 7,935,413 B2 | 5/2011 | Stamm | |
| 2001/0007719 A1 * | 7/2001 | Maloney | 428/633 |
| 2002/0155316 A1 * | 10/2002 | Zheng | 428/678 |
| 2005/0036891 A1 * | 2/2005 | Spitsberg et al. | 416/241 R |
| 2006/0093801 A1 * | 5/2006 | Darolia et al. | 428/215 |
| 2013/0061775 A1 | 3/2013 | Kulkarni et al. | |

FOREIGN PATENT DOCUMENTS

| | | |
|---|---|---|
| EP | 0848077 A1 | 6/1998 |
| WO | 2009038743 A1 | 3/2009 |

* cited by examiner

*Primary Examiner* — Colin W Slifka

(57) ABSTRACT

A bond coating having high corrosion and oxidation resistance and good compatibility with a thermal barrier coating is disclosed. The bond coating may be an optimized NiCrAlY material with additional materials that eliminates the presence of beta phase for oxidation by replacing the beta phase with a gamma/gamma prime system. The bond coating may also decrease the presence of phases that are detrimental to the mechanical and oxidation properties of the system, such as the sigma and BCC chromium phases. The bond coating may also have a gamma/gamma prime transition temperature that is about 400 degrees Celsius higher than conventional bond coatings, which enables local stresses to be reduced.

17 Claims, 3 Drawing Sheets

HIGH TEMPERATURE BOND COATING WITH INCREASED OXIDATION RESISTANCE

FIELD OF THE INVENTION

The invention relates to a bond coating and more particularly, to a bond coating configured to protect nickel-based or cobalt-based materials forming components suited for use in gas turbine engines.

BACKGROUND OF THE INVENTION

Because of the high temperature environment found within the hot gas path of gas turbine engines, components residing therein are typically formed from nickel-based or cobalt-based materials. These materials are optimized for strength and are typically not able to withstand oxidation and corrosion at higher temperatures. Thus, these materials must be protected from oxidation via coatings, which are typically formed from MCrAlY and other aluminum rich coatings. Such coatings can be used for oxidation and corrosion protection and as bond coatings for thermal barrier coating (TBC) systems as well. In TBC systems, the MCrAlY coating protects the underlying material from hot gas exposure and provides a mechanism for adherence of the TBC systems to the component. Turbine engines that are often being operated at ever increasing internal hot gas path temperatures are exposed to a heightened propensity of failure of the coating which leads to spallation of the thermal barrier coating. Thus, there exists a need for improved coatings capable of withstanding a higher temperature environment with a lower propensity of bond coating degradation and provides for an enhanced resistance of the TBC to spallation.

SUMMARY OF THE INVENTION

This application is directed to a bond coating having high corrosion and oxidation resistance and good compatibility with a thermal barrier coating. The bond coating may be an optimized NiCrAlY material with additional materials that eliminate the presence of beta phase for oxidation by replacing the beta phase with a gamma/gamma prime system. The bond coating may also decrease the presence of phases that are detrimental to the mechanical and oxidation properties of the system like the sigma and BCC chromium phases. The bond coating may also have a gamma/gamma prime transition temperature that is about 400 degrees Celsius higher than conventional bond coatings, which enables local stresses to be reduced.

The bond coating for gas turbine engines may be formed from materials including, but not limited to aluminum, chromium, tantalum, iron, yttrium and neodymium. In at least one embodiment, the bond coating may be formed from 7.75 weight percent aluminum, 0 weight percent cobalt, 14.4 weight percent chromium, 6 weight percent tantalum, 2.7 weight percent iron, 0.3 weight percent yttrium, and 0.03 weight percent neodymium.

A method of protecting a gas turbine engine component from high temperatures present in a hot gas path of the gas turbine engine may include applying the bond coating to a component. The bond coating may be positioned between the component and one or more thermal barrier coating (TBC) layers. The method may include presenting a bond coating material formed from materials including, but not limited to aluminum, chromium, tantalum, iron, yttrium and neodymium. In at least one embodiment, the bond coating may be formed from 7.75 weight percent aluminum, 0 weight percent cobalt, 14.4 weight percent chromium, 6 weight percent tantalum, 2.7 weight percent iron, 0.3 weight percent yttrium, and 0.03 weight percent neodymium. The method may also include applying the bond coating to the gas turbine component. Application of the bond coating may be via a high velocity oxy-fuel process, via an air plasma spraying process, via a low pressure plasma spray process, via an electron beam vapor deposition process, via a cold spray process or other appropriate method.

An advantage of the bond coating is that the bond coating has improved adhesion of the thermally grown oxide layer and has enhanced TBC spallation resistance.

Another advantage of the bond coating is that the elimination of the presence of the deleterious sigma phase results in improved mechanical properties over conventional high aluminum coatings.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 2:
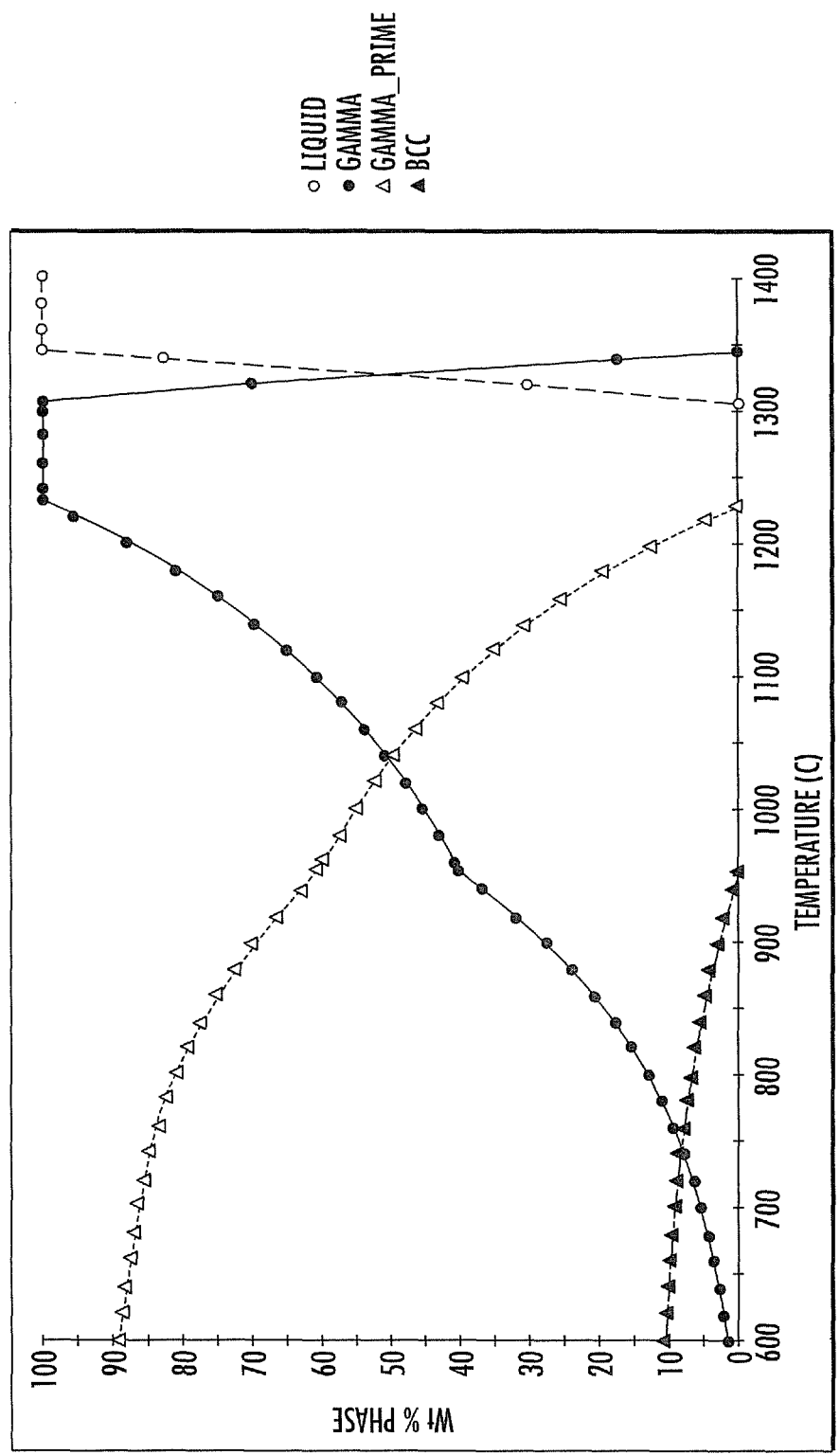
FIG. 2 is a phase diagram of a bond coating of this invention.
Figure 3:
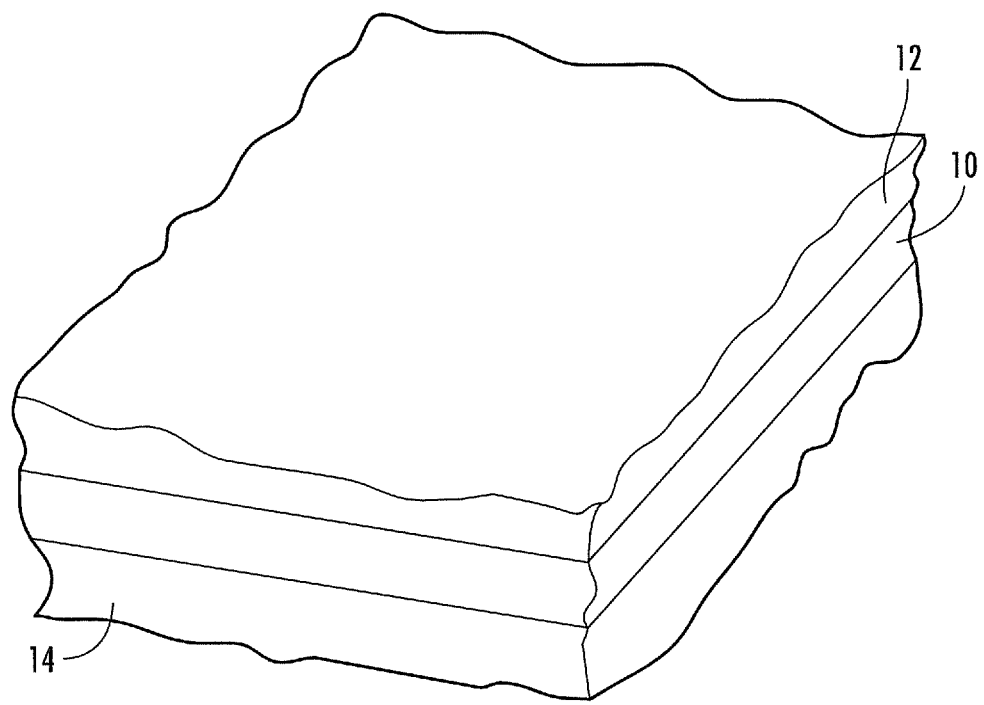
FIG. 3 is a partial cross-sectional view of a turbine component with the bond coating and a thermal barrier coating.

As shown in FIGS. 2 and 3, this invention is directed to a bond coating 10 having high corrosion and oxidation resistance and good compatibility with a thermal barrier coating 12. The bond coating 10 may be an optimized NiCrAlY material with additional materials that eliminates the presence of beta phase for oxidation by replacing the beta phase with a gamma/gamma prime system. The bond coating 10 may also decrease the presence of phases that are detrimental to the mechanical and oxidation properties of the system, such as the sigma and BCC chromium phases. These phases are topographically close-packed (TCP) structures that reduce a system's ductility and thermo-mechanical performance. The bond coating 10 has a gamma/gamma prime transition temperature that is about 400 degrees Celsius higher than conventional bond coatings, which enables local stresses to be reduced.

The bond coating 10 may have a good, long life, with acceptable mechanical properties and an improved oxidation resistance. The bond coating 10 for gas turbine engines may be formed from materials including, but not limited to aluminum, chromium, tantalum, iron, yttrium and neodymium. In at least one embodiment, the bond coating 10 may be formed from at least one weight percent aluminum, 0 weight percent cobalt, at least one weight percent chromium, between four and eight weight percent tantalum, between 0.5 and five weight percent iron, between 0.1 and 0.7 weight percent yttrium, and between 0 and 1.5 weight percent neodymium. In at least one embodiment, the bond coating 10 may be formed from at least one weight percent aluminum, 0 weight percent cobalt, at least one weight percent chromium, between five and seven weight percent tantalum, between one and four weight percent iron, between 0.1 and 0.7 weight percent yttrium, and between 0 and 1.5 weight percent neodymium. In yet another embodiment, the bond coating 10 may be formed from 7.75 weight percent aluminum, 0 weight percent cobalt, 14.4 weight percent chromium, 6 weight percent tantalum, 2.7 weight percent iron, 0.3 weight percent yttrium, and 0.03 weight percent neodymium. The bond coating 10 has been optimized such that the sigma and BCC chromium phases that decrease thermo-mechanical properties have been reduced to accommodate aluminum. Neodymium has been included in an amount that improves the adhesion of the thermally grown oxide layer and promotes enhanced TBC spallation resistance. In addition, neodymium has been added in an amount that provides these benefits without detrimentally affecting the mechanical properties of the bond coating 10.

Figure 1:
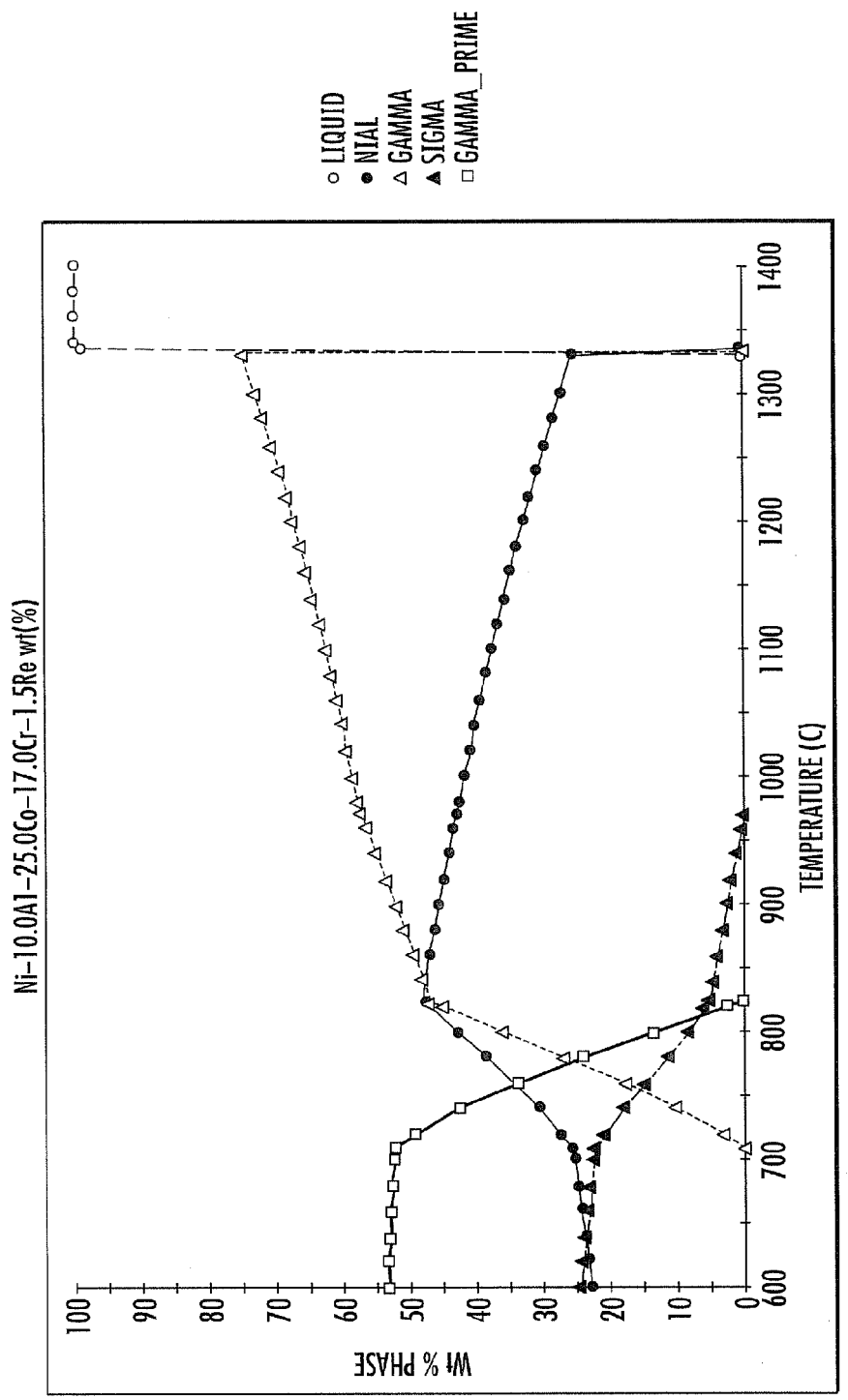
FIG. 1 is a phase diagram of a prior art high oxidation resistance bond coating.

The bond coating 10 may include tantalum and iron which results in a coating with a high gamma to gamma prime transition temperature that replaces the beta phase resulting in a greater oxidation resistance at higher temperature than conventional coatings. The elimination of the beta phase, if accomplished in conjunction with complete elimination of the presence of the deleterious sigma phase, results in improved mechanical properties over conventional high aluminum coatings. As shown in FIG. 2, the bond coating 10 may have an improved gamma/gamma prime transition temperature that is about 400 degrees Celsius higher than conventional coatings, as depicted in FIG. 1. As such, local stresses in the service temperature area are reduced. As shown in FIG. 2, the bond coating 10 may have similar Al-rich beta content that along with the high gamma prime and low gamma concentrations contribute to excellent oxidation resistance. The bond coating 10 may also have a lower concentration of detrimental sigma and BCC phases 12, which show the superior thermo-mechanical properties of the bond coating 10 at low temperature.

A method of protecting a gas turbine engine component from high temperatures present in a hot gas path of the gas turbine engine may include applying the bond coating 10 to a component 14, as shown in FIG. 3. The bond coating 10 may be positioned between the component and one or more thermal barrier coating (TBC) layers 12. The method may include presenting a bond coating material formed from materials including, but not limited to aluminum, chromium, tantalum, iron, yttrium and neodymium. In at least one embodiment, the bond coating 10 may be formed from 7.75 weight percent aluminum, 0 weight percent cobalt, 14.4 weight percent chromium, 6 weight percent tantalum, 2.7 weight percent iron, 0.3 weight percent yttrium, and 0.03 weight percent neodymium. The method may also include applying the bond coating 10 to the gas turbine component. Application of the bond coating 10 may be via a high velocity oxy-fuel process, via an air plasma spraying process, via a low pressure plasma spray process, via an electron beam vapor deposition process, via a cold spray process or other appropriate method.

The foregoing is provided for purposes of illustrating, explaining, and describing embodiments of this invention. Modifications and adaptations to these embodiments will be apparent to those skilled in the art and may be made without departing from the scope or spirit of this invention.

We claim:
1. A bond coating for gas turbine engine components, comprising:
   a two phase bond coating gamma/gamma prime system formed from at least one weight percent aluminum and up to 7.75 weight percent aluminum;
   0 weight percent cobalt;
   at least one weight percent chromium and up to 14.4 weight percent chromium;
   between six and eight weight percent tantalum;
   between 0.5 and five weight percent iron;
   between 0.1 and 0.7 weight percent yttrium; and
   neodymium present in an amount of up to 1.5 weight percent.
2. The bond coating of claim 1, wherein the bond coating includes 7.75 weight percent aluminum.
3. The bond coating of claim 1, wherein the bond coating includes 14.4 weight percent chromium.
4. The bond coating of claim 1, wherein the bond coating includes between five and seven weight percent tantalum.
5. The bond coating of claim 4, wherein the bond coating includes 6 weight percent tantalum.
6. The bond coating of claim 1, wherein the bond coating includes between one and four weight percent iron.
7. The bond coating of claim 6, wherein the bond coating includes 2.7 weight percent iron.
8. The bond coating of claim 1, wherein the bond coating includes 0.3 weight percent yttrium.
9. The bond coating of claim 1, wherein the bond coating includes 0.03 weight percent neodymium.
10. A bond coating for gas turbine engine components, comprising:
    a two phase bond coating gamma/gamma prime system formed from at least one weight percent aluminum and up to 7.75 weight percent aluminum;
    0 weight percent cobalt;
    at least one weight percent chromium and up to 14.4 weight percent chromium;
    between six and seven weight percent tantalum;
    between one and four weight percent iron;
    between 0.1 and 0.7 weight percent yttrium; and
    neodymium present in an amount of up to 1.5 weight percent.
11. The bond coating of claim 10, wherein the bond coating includes 7.75 weight percent aluminum.
12. The bond coating of claim 10, wherein the bond coating includes 14.4 weight percent chromium.
13. The bond coating of claim 10, wherein the bond coating includes 6 weight percent tantalum.
14. The bond coating of claim 10, wherein the bond coating includes 2.7 weight percent iron.
15. The bond coating of claim 10, wherein the bond coating includes 0.3 weight percent yttrium.
16. The bond coating of claim 10, wherein the bond coating includes 0.03 weight percent neodymium.
17. A bond coating for gas turbine engine components, comprising:
    a two phase bond coating gamma/gamma prime system formed from 7.75 weight percent aluminum;
    0 weight percent cobalt;
    14.4 weight percent chromium;
    6 weight percent tantalum;
    2.7 weight percent iron;
    0.3 weight percent yttrium; and
    0.03 weight percent neodymium.

* * * * *